US012586379B2

(12) United States Patent (10) Patent No.: US 12,586,379 B2
Huang et al. (45) Date of Patent: Mar. 24, 2026

(54) SYSTEM FOR DETECTING OCCURRENCE PERIOD OF CYCLICAL EVENT

(71) Applicants: Inventec (Pudong) Technology Corporation, Shanghai (CN); INVENTEC CORPORATION, Taipei City (TW)

(72) Inventors: Jing-Lun Huang, Taipei City (TW); Yu-Lun Chang, Taipei City (TW); Wei-Chao Chen, Taipei City (TW)

(73) Assignees: INVENTEC (PUDONG) TECHNOLOGY CORPORATION, Shanghai (CN); INVENTEC CORPORATION, Taipei City (TW)

( * ) Notice: Subject to any disclaimer, the term of this patent is extended or adjusted under 35 U.S.C. 154(b) by 320 days.

(21) Appl. No.: 18/545,794

(22) Filed: Dec. 19, 2023

(65) Prior Publication Data

US 2025/0078512 A1     Mar. 6, 2025

(30) Foreign Application Priority Data

Sep. 6, 2023    (CN) .......................... 202311150171.8

(51) Int. Cl.
*G06V 20/52* (2022.01)
*G06V 10/22* (2022.01)
(Continued)

(52) U.S. Cl.
CPC ............ *G06V 20/52* (2022.01); *G06V 10/235* (2022.01); *G06V 10/454* (2022.01); *G06V 10/62* (2022.01); *G06V 20/44* (2022.01); *G06V 20/46* (2022.01)

(58) Field of Classification Search
CPC ........ G06V 20/40; G06V 20/46; G06V 20/52;
G06V 10/454; G06V 10/82; G06V 10/62;
G06V 2201/06; G06V 10/22; G06V
10/235; G06V 10/25; G06V 20/44; G06T
2207/20081; G06T 2207/20084;
(Continued)

(56) References Cited

U.S. PATENT DOCUMENTS 10,558,207 B1 * 2/2020 McGuirk ........... G05B 23/0283
2022/0156501 A1 * 5/2022 Zhang .................. G06V 10/803

OTHER PUBLICATIONS

Zhu, Qiang, et al. "Fitness heart rate measurement using face videos." 2017 IEEE International Conference on Image Processing (ICIP). IEEE, 2017. (Year: 2017).*

* cited by examiner

*Primary Examiner* — Geoffrey E Summers
(74) *Attorney, Agent, or Firm* — Muncy, Geissler, Olds & Lowe, P.C.

(57) ABSTRACT

A system for detecting an event occurrence period of cyclical event includes an image monitoring device and a period judgment device. The image monitoring device captures monitoring images respective in image capturing times. The period judgment device extracts feature vectors from the monitoring images to calculate vector values to accordingly generate a vector value time domain signal, executes a short-time Fourier transform (STFT) with a window width time to transform the vector value time domain signal to a spectrogram, makes the spectrogram be denoised to generate a representative frequency time domain signal, and calculates an event-cycle achievement rate and a product term accumulation number after each window width time, so as to accordingly calculate event occurrence time and the event occurrence period.

8 Claims, 12 Drawing Sheets

(51) Int. Cl.
*G06V 10/44*       (2022.01)
*G06V 10/62*       (2022.01)
*G06V 20/40*       (2022.01)

(58) Field of Classification Search
CPC ................................ G06T 7/0004–001; G06T
2207/30108–30164; G06N 3/02–0985
See application file for complete search history.

ROI

ROI

ROI

ROI

ROI

100

1

Image monitoring device

SYSTEM FOR DETECTING OCCURRENCE PERIOD OF CYCLICAL EVENT

This application claims the benefit of China Patent Application Serial No. 202311150171.8, filed Sep. 6, 2023, the subject matter of which is incorporated herein by reference.

BACKGROUND OF THE INVENTION

(1) Field of the Invention

The invention relates to a detecting system, and more particularly to a system for detecting an occurrence period of a cyclical event.

(2) Description of the Prior Art

As the industry develops toward automation and intelligence, unmanned and robotic production lines have gradually become one of mainstream developments, and the production and quality monitoring work accompanying the production lines are naturally replaced by automated equipment.

Since a workpiece or product on a production line is presumed to undergo periodic steps according to an established work sequence, and once the workpiece or product cannot complete the work sequence at any step, the entire production line would be delayed. Therefore, to maintain a smooth running of the production line, appropriate devices are required to monitor cycling work at each work station thereof.

In view of the existing work cycle detection technology, a large number of detection devices (such as light-shielding detection devices, touch detection devices, pressure sensing devices or chip detection devices, etc.) are introduced to monitor orientations of workpieces or movement trajectories of specific mechanisms or objects. Further, the internet of things technology and the big data computing platform can be utilized to analyze and confirm whether or not the work steps at each work station is indeed completed within the allowed work cycle.

However, since work content at each work station may be totally different, thus, to fully implement the above technology, it is necessary to set up a variety of different detection devices to detect different parameters (such as temperatures, pressures, number of touches, touch time, signal light-interruption interruption time, signal light-interruption delay time, signal light-interruption duration, etc.) according to the actual work content of each work station. In the event that the work contents of the production line are adjusted, types of detection devices and installation locations will also need to be readjusted. In other words, the previous work cycle detection technology generally lacks versatility and cannot be applied to all work stations. Therefore, it is inevitable to cost further more in detecting the work event cycles of different work stations on the same production line.

SUMMARY OF THE INVENTION

In view that, in the previous art, the event-occurrence cycle detection technology generally lacks versatility, thus plenty of cost and resources are required to fulfill individual detection of event occurrence periods of different cyclical events. Accordingly, it is an object of the present invention to provide a new period detection technology, so that it can be widely used to detect the event occurrence period of multiple different types of cyclical events, making it particularly suitable for use in detecting multiple cyclical events of work stations.

In this present invention, a system for detecting occurrence period of cyclical event, applied to detect an event occurrence period of a cyclical event, includes an image monitoring device and a period judgment device.

The image monitoring device is configured for capturing periodically a plurality of monitoring images at a plurality of image capturing times from a monitoring field according to an image capturing period, so as to form in series a dynamic surveillance image data, in which the cyclical event is occurred in the monitoring field.

The period judgment device, communicatively connected with the image monitoring device, is furnished with a judgment program, and the judgment program is executed to create a feature-vector capturing module, a signal generation module, a spectrum conversion and analysis module, a noise filtration module and an event-occurrence period judgment module.

The feature-vector capturing module is configured for capturing the dynamic surveillance image data from the image monitoring device, and further for capturing a plurality of feature vectors of the plurality of monitoring images corresponding to the plurality of image capturing times from the dynamic surveillance image data by utilizing a mathematical operation model generated through deep learning.

The spectrum conversion and analysis module is configured for generating a spectrogram by applying a short-time Fourier transform upon the vector-value time domain signal through a plurality of window widths, in which the spectrogram includes a plurality of composition frequencies and correspondingly a plurality of composition-frequency signals and a plurality of composition-frequency amplitudes. The noise filtration module is configured for filtering at least one noise signal corresponding to part of the plurality of composition frequencies, capturing the rest of the plurality of composition-frequency signals corresponding to the rest of the plurality of composition frequencies (defined as a plurality of valid composition-frequency signals), capturing one of the plurality of valid composition-frequency signals having the maximum amplitude from each of the plurality of window widths, defining a composition frequency of the one of the plurality of valid composition-frequency signals having the maximum amplitude as a representative frequency for the instant window width, and generating accordingly a representative frequency time domain signal.

The event-occurrence period judgment module is configured for calculating a plurality of event occurrence times for further determining the event occurrence period according to the representative frequency time domain signals and the plurality of window widths.

In one embodiment of this present invention, the spectrum conversion and analysis module is configured for defining the maximum of the plurality of composition-frequency amplitudes as a maximum amplitude, and defining one of the plurality of composition frequencies corresponding to the maximum amplitude as a main frequency. The noise filtration module defines a critical noise amplitude according to the maximum amplitude, and filters part of the plurality of composition-frequency signals (noise signal) corresponding to the at least one composition frequency having an amplitude less than the critical noise amplitude from part of the plurality of composition-frequency amplitudes. Preferably, the critical noise amplitude is 10% of the maximum amplitude. Preferably, the window width is equal to the image capturing period, and the spectrum conversion and analysis module is to perform the short-time Fourier transform with the image capturing period.

The image monitoring device can be an IP cam, the cyclical event can be a periodic work event of a production line, and the monitoring field can be a work station monitoring field of the production line. In addition, the period judgment device further includes a human-machine interface module for a user to set a concern area in the monitoring field, and the cyclical event occurs periodically in the concern area. Preferably, the human-machine interface module includes a monitor and an operation interface. The monitor is configured for displaying the dynamic surveillance image data of the monitoring field, and the operation interface is configured for the user to set the concern area.

The feature-vector capturing module further includes a concern-area feature-vector capturing unit, the concern-area feature-vector capturing unit is configured for utilizing the mathematical operation model to capture the plurality of feature vectors of the plurality of monitoring images corresponding to the plurality of image capturing times from part of the dynamic surveillance image data corresponding to the concern area.

The event-occurrence period judgment module further includes an achievement-rate calculating unit, a statistical unit, an event-occurrence time calculating unit and an event-occurrence period calculating unit. The achievement-rate calculating unit is configured for calculating a time-interval frequency product term by multiplying each of the plurality of analysis intervals and the corresponding representative frequency, and the time-interval frequency product term is sequentially accumulated to obtain an event-cycle achievement rate. The statistical unit is configured for calculating product-term accumulation number upon every time when the event achievement rate just reaches an integer, and then calculating a plurality of the product-term accumulation numbers correspondingly upon when the event achievement rate just reaches a plurality of the integers. The event-occurrence time calculating unit is configured for multiplying each of the plurality of product-term accumulation numbers and the corresponding window width, so as to calculate a plurality of event occurrence times. The event-occurrence period calculating unit is configured for calculating the event occurrence period according to according to at least one event-occurrence time difference of any two neighboring event occurrence times.

As stated, in the system for detecting occurrence period of cyclical event provided by this invention, the event occurrence period of the cyclical event is directly analyzed from the monitoring images in the dynamic surveillance image data, and thus the system can be directly applied to detect the event occurrence periods (such as the work-event occurrence period of the work station) of different cyclical events (such as the periodic work event of the work station). Thereupon, the effect of event-occurrence period detection of multiple different cyclical events can be obtained without spending more resources and money.

Especially when the system of this invention is applied to a work station, it is no more need to spend further resources to easily detect the work event occurrence period of multiple different work stations. Thus, costs for detecting multiple work event cycles of work events in the production line can be significantly reduced.

All these objects are achieved by the system for detecting occurrence period of cyclical event described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a system for detecting occurrence period of cyclical event. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Since the system for detecting occurrence period of cyclical event provided by the present invention can be widely used to detect the event occurrence period of a variety of different cyclical events, particularly suitable for detecting the event occurrence period of cyclical work events, thus common details thereabout would be elucidated simply by enumerating one of the preferred embodiments applied to work stations of a production line. Also, it shall be understood that the preferred embodiment raised below is only used to conveniently and clearly assist in explaining the purpose and efficacy of the present invention.

Figure 1:
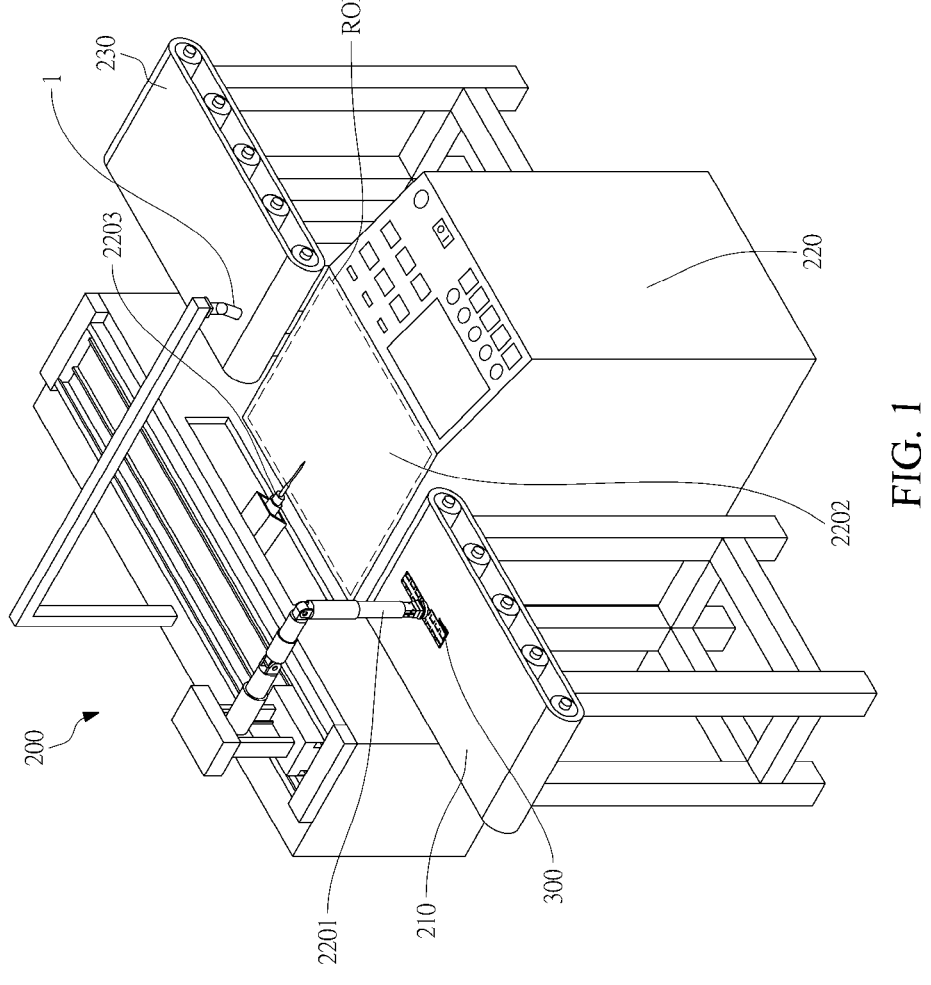
FIG. 1 is a schematic view showing that an image monitoring device of a preferred embodiment of the system for detecting occurrence period of cyclical event in accordance with the present invention captures dynamic surveillance image data from a monitoring field.
Figure 2A:
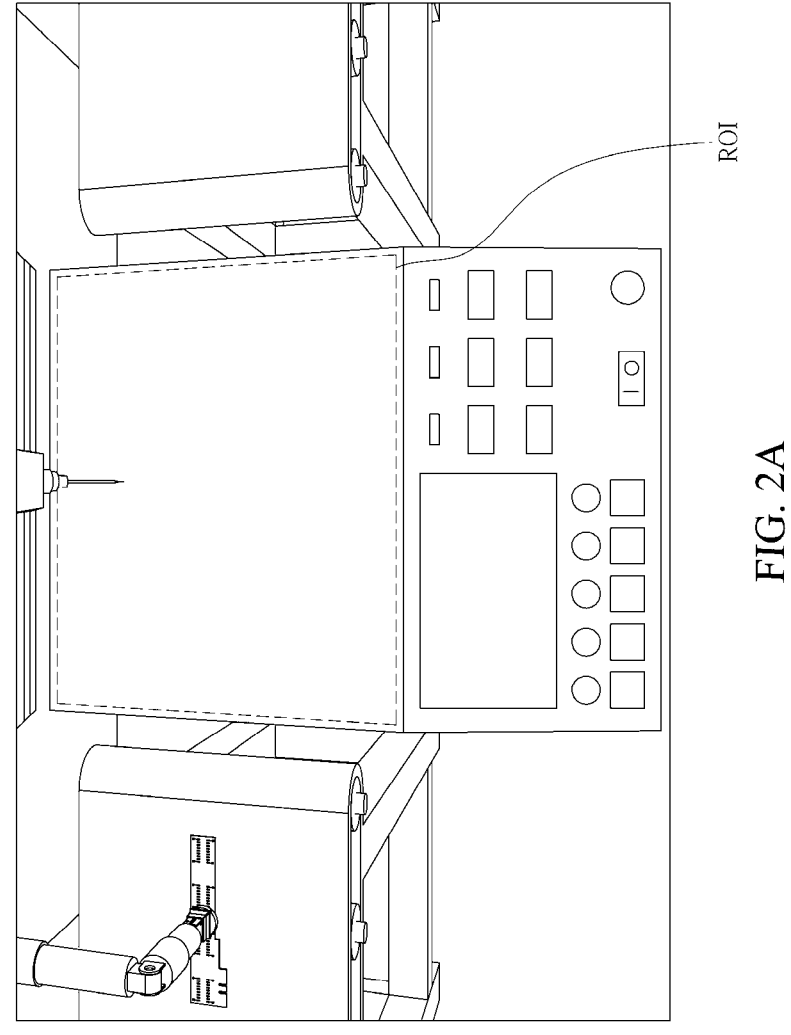
FIG. 2A to FIG. 2E show monitoring images captured at individual image capturing times within an event occurrence period.
Figure 2B:
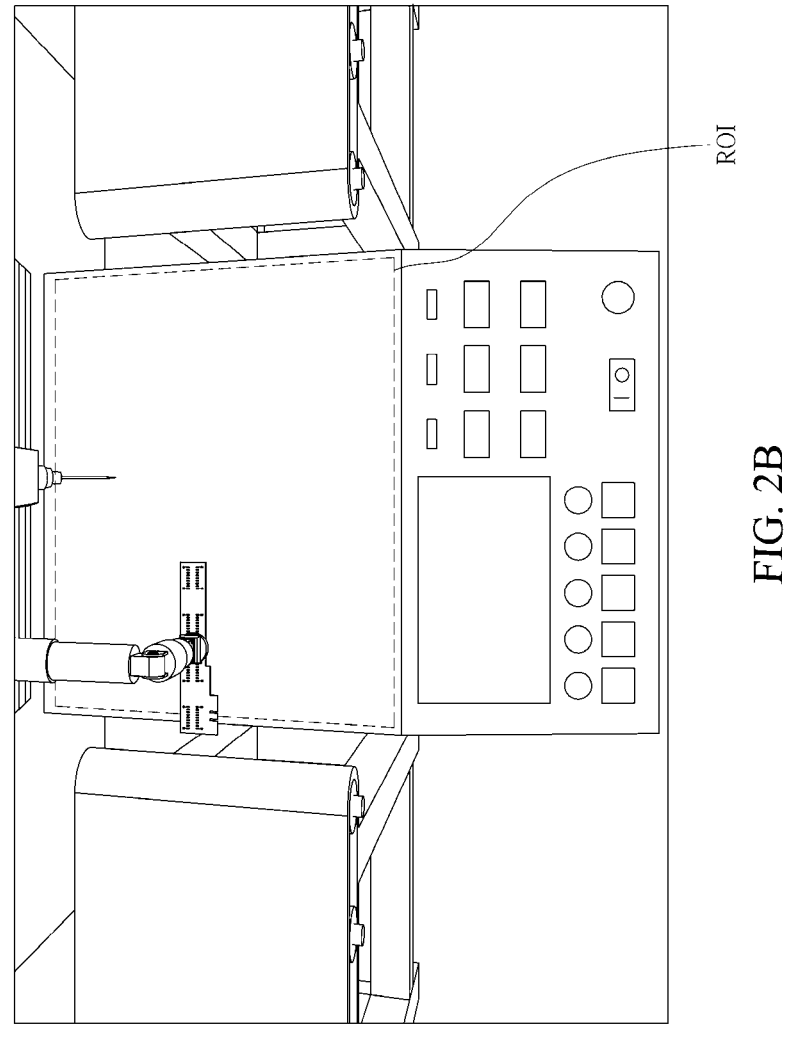
Figure 2C:
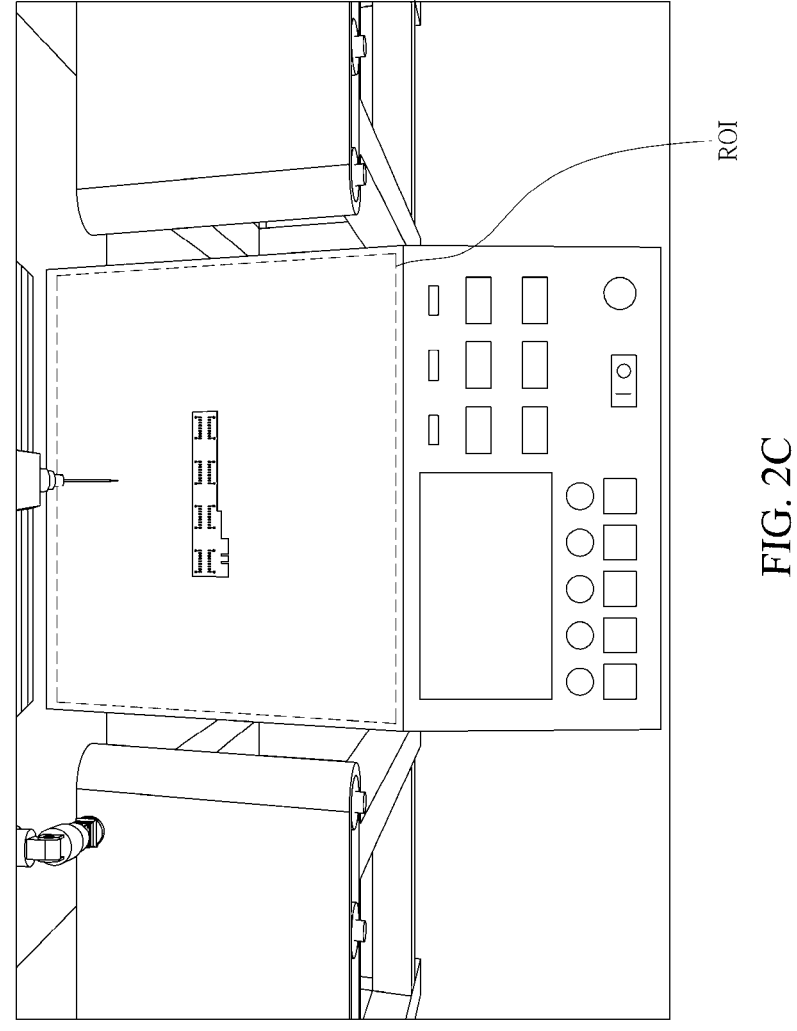
Figure 2D:
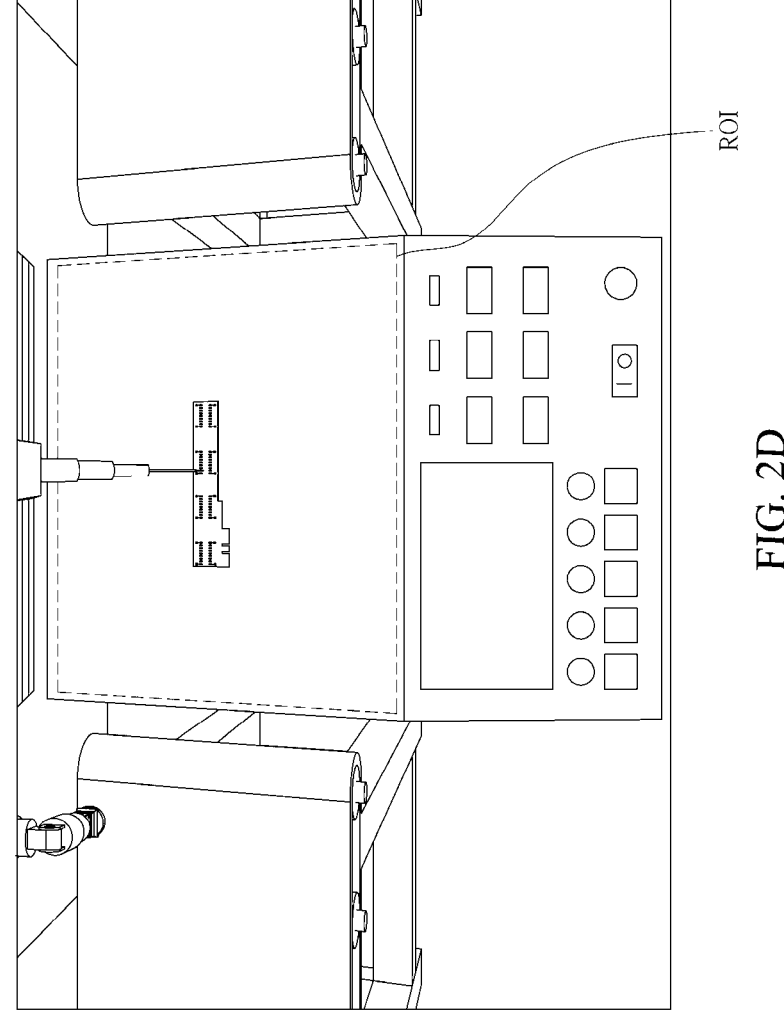
Figure 2E:
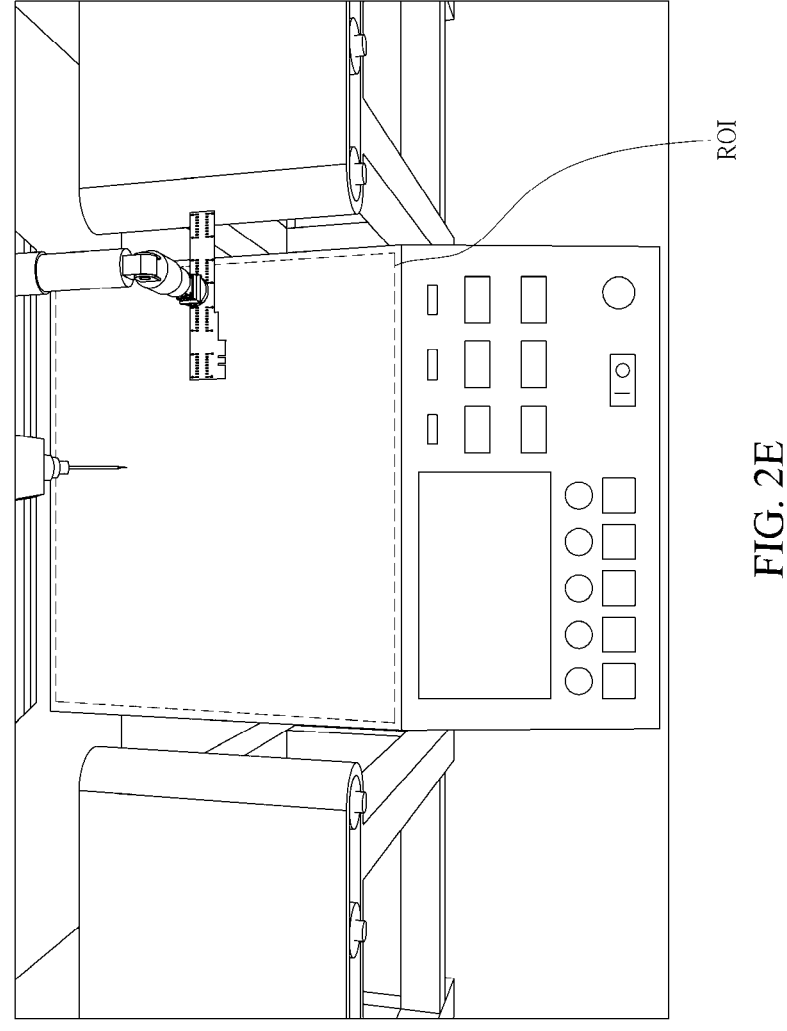
Figure 3:
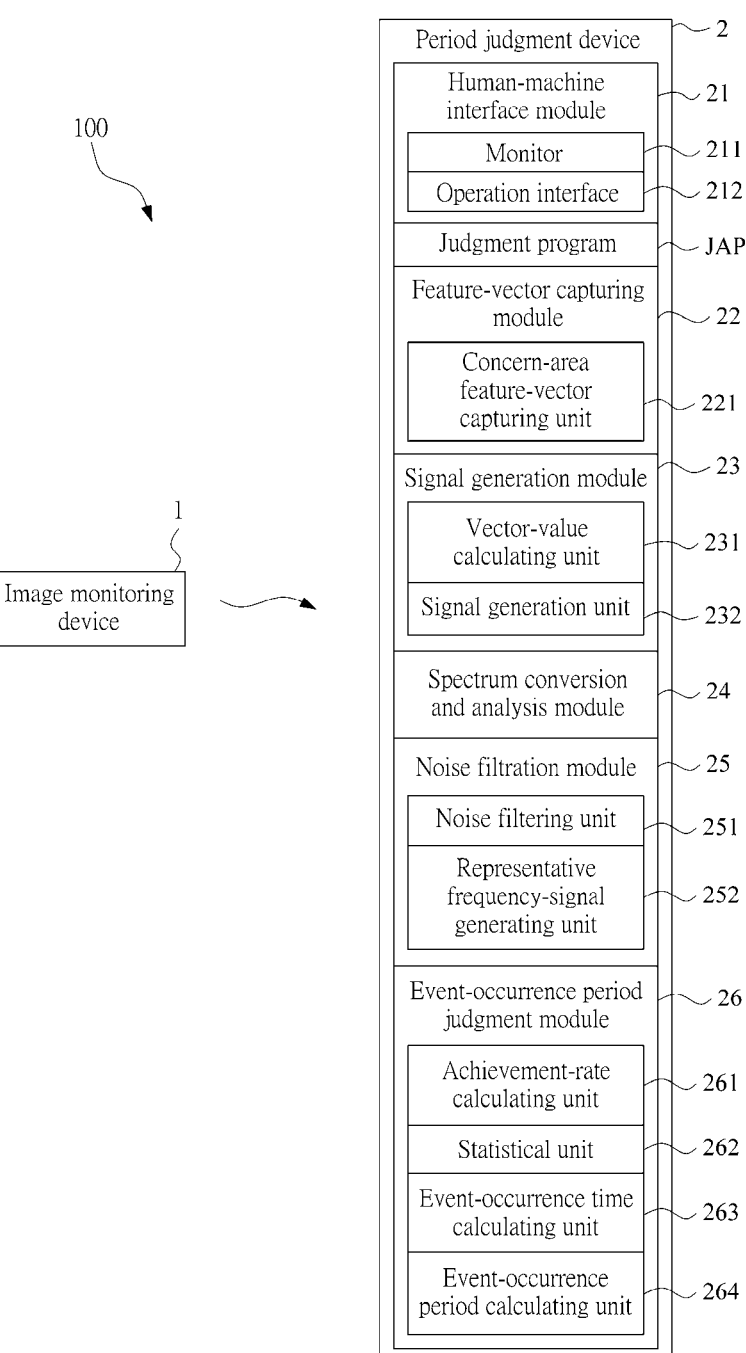
FIG. 3 is a schematic view of functions provided by the preferred embodiment of the system for detecting occurrence period of cyclical event in accordance with the present invention.

Refer to FIG. 1 to FIG. 3; where FIG. 1 is a schematic view showing that an image monitoring device of a preferred embodiment of the system for detecting occurrence period of cyclical event in accordance with the present invention captures dynamic surveillance image data from a monitoring field, FIG. 2A to FIG. 2E show monitoring images captured at individual image capturing times within an event occurrence period, and FIG. 3 is a schematic view of functions provided by the preferred embodiment of the system for detecting occurrence period of cyclical event in accordance with the present invention. In this embodiment, a system for detecting occurrence period of cyclical event ("detecting system" hereinafter) 100 is applied to detect an event occurrence period of a cyclical event, and includes an image monitoring device 1 and a period judgment device 2. The cyclical event can be a periodic work event of a work station 200 of a production line.

The work station 200 includes an input conveyor belt 210, a work equipment 220 and an output conveyor belt 230. The work equipment 220 includes a robotic arm 2201, a work platform 2202 and a detection probe 2203. In this embodiment, the periodic work event occurring at the work station 200 may include, in a time sequence, the steps of: utilizing the input conveyor belt 210 to transmit a circuit board to be tested 300 toward the work equipment 220; utilizing the robotic arm 2201 to capture the circuit board to be tested 300 from the input conveyor belt 210; moving the circuit board to be tested 300 to the work platform 2202; protruding the detection probe 2203 out to contact the circuit board to be tested 300; and, retrieving the detection probe 2203 back to use the robotic arm 221 to move the circuit board to be tested from the work platform 222 to the output conveyor belt 230.

According to a working sequence of the work station 200, the periodic work event would be periodically performed in an event occurrence period. The image monitoring device 1 can be an IP cam disposed at the work station 200, and can follow an image capturing period to periodically capture a plurality of monitoring images from a monitoring field correspondingly a plurality of image capturing time, such that a serial dynamic surveillance image data can be formed. In this embodiment, the cyclical event is occurred in the monitoring field.

In this embodiment, the "image capturing period" is directed to the time interval of any two neighboring capturing of static surveillance images; i.e., an inverse of the frame rate in the dynamic surveillance image data. In this embodiment, the frame rate is 30 fps; i.e., to capture 30 static surveillance images per second, equivalent to a $\frac{1}{30}$ seconds for the image capturing period, and also about 0.033 seconds. In other words, the dynamic surveillance image data is formed by connecting the plurality of monitoring images in series by a 30 fps frame rate.

In this embodiment, the "monitoring field" is directed to the field of vision for the image monitoring device 1 to capture the images. In this embodiment, since the cyclical event is a periodic work event occurring in the production line 200. Thus, the monitoring field is a work-station monitoring field of the production line 200 that covers part of the input conveyor belt 210, the work equipment 200 and part of the output conveyor belt 230; i.e., the corresponding areas shown from FIG. 2A to FIG. 2E. As described above, while the periodic work event follows the time order to perform each of the aforesaid steps at the corresponding instants, the image monitoring device 1 would capture the corresponding monitoring images, as shown from FIG. 2A to FIG. 2E.

The period judgment device 2 can be an industrial computer, a desktop computer, a notebook computer, a tablet computer or a smart phone. The period judgment device 2, communicatively connected with the image monitoring device 1 through a cable or wireless manner, includes a human-machine interface module 21, and is furnished with a judgment program JAP. The human-machine interface module 21 includes a monitor 211 and an operation interface 212. The monitor 211 can display the dynamic surveillance image data of the monitoring field. The operation interface

212 can be a touch pad, a button or a mouse, for a user (for example, the operator of the period judgment device 2) to set a concern area ROI in the monitoring field.

Generally speaking, the concern area ROI can be selected to be an area with a more remarkable periodic change in the dynamic surveillance image data or an area able to cover simultaneously more cyclical events, when the cyclical events occur; namely, to choose an area that can mostly reflect the periodic change of the cyclical events. In this embodiment, the area that can mostly reflect the periodic change of the cyclical events is the work platform 2202. Thereupon, the area enclosed by the surrounding contours close to the work platform 2202 can be defined to be the concern area ROI.

After the judgment program JAP is executed, the period judgment device 2 can further include a feature-vector capturing module 22, a signal generation module 23, a spectrum conversion and analysis module 24, a noise filtration module 25 and an event-occurrence period judgment module 26.

The feature-vector capturing module 22, including a concern-area feature-vector capturing unit 221, can directly capture a plurality of feature vectors of the monitoring images from the dynamic surveillance image data corresponding to the image capturing time by utilizing a mathematical operation model formed through deep learning. Preferably, the concern-area feature-vector capturing unit 221 of the feature-vector capturing module 22 can be also utilized, through deep learning, to generate another mathematical operation model, and so to capture a plurality of feature vectors of the monitoring images corresponding to the image capturing time from part of the dynamic surveillance image data corresponding to the concern area ROI.

Regarding the mathematical operation model, in the early stage, relevant parameters of each pixel such as hue, chroma, grayscale, sharpness, saturation, etc. can be used as input data for initial learning, and similar neural networks, regression operations, or other learning algorithms can be used to establish an initial mathematical operation model. Then, through multiple deep learning for continuous updating, modifications upon the initial mathematical operation model can be produced. The so-called feature vectors are multiple representative feature variables captured by the mathematical operation model from each monitoring image (i.e., each frame). Each of the feature variables can be treated as a multidimensional vector from a single component.

For example, if the mathematical operation model can capture four representative feature variables $A_1$, $B_1$, $C_1$ and $D_1$ from the first frame of the monitoring images. Then, the vector $(A_1, B_1, C_1, D_1)$ can be defined as the feature vector for the first frame of the monitoring images. Similarly, the mathematical operation model can be applied again to capture another four representative feature variables $A_2$, $B_2$, $C_2$ and $D_2$ from the second frame of the monitoring images, and the vector $(A_2, B_2, C_2, D_2)$ would be defined as the feature vector for the second frame of the monitoring images. In fact, the number of representative feature variables may be several, dozens or even hundreds, depending on the operation results of the mathematical operation model obtained after multiple learning modifications. Different mathematical operation models may render different number of the feature variables.

It shall be emphasized that, since the cyclical event would occur periodically, plural monitoring images may lead to periodic changes. Thus, no matter which mathematical operation model is utilized to capture feature vectors from a plurality of monitoring images, these feature vectors would vary periodically accordingly. Nevertheless, even different deep learning are adopted, the resulted mathematical operation model can be still applicable to the present invention.

In this embodiment, the image capturing period is set to be ⅟₃₀ second. Then, the first image capturing time to capture the first frame of the monitoring images is at ⅟₃₀ second, and the corresponding feature vector is $(A_1, B_1, C_1, D_1)$; the second image capturing time to capture the second frame of the monitoring images is at ⅖₃₀ second, and the corresponding feature vector is $(A_2, B_2, C_2, D_2)$; and, the rest can be deduced.

The signal generation module 23 includes a vector-value calculating unit 231 and a signal generating unit 232. The vector-value calculating unit 231 is to calculate the feature vectors to obtain a plurality of vector values according to the occurrence order of the image capturing times. These vector values can be calculated by taking the sum of squares and root. For example, the vector value $V_1$ for the feature vector $(A_1, B_1, C_1, D_1)$ is equal to $\sqrt{A_1{}^2+B_1{}^2+C_1{}^2+D_1{}^2}$, and the vector value $V_2$ for the feature vector $(A_2, B_2, C_2, D_2)$ is equal to $\sqrt{A_2{}^2+B_2{}^2+C_2{}^2+D_2{}^2}$.

Figure 4:
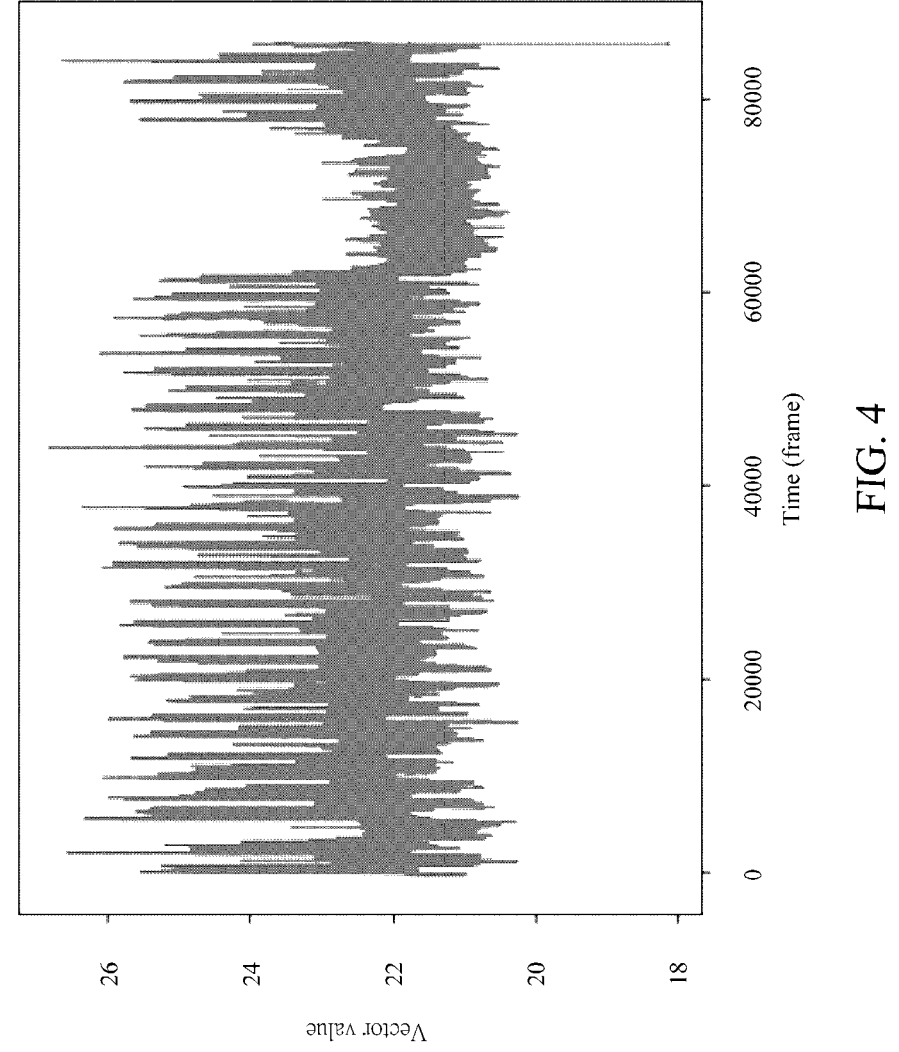
FIG. 4 is a schematic waveform graph of a vector-value time domain signal generated by the preferred embodiment of the system for detecting occurrence period of cyclical event in accordance with the present invention.

The signal generating unit 232 can generate a vector-value time domain signal according to the corresponding vector value and the image capturing time. For example, if the first frame (at ⅟₃₀ second) is corresponding to the vector value $V_1$, the second frame (at ⅖₃₀ second) is corresponding to the vector value $V_2$, and so on. Through the relationship between the vector values and the corresponding timing, a waveform graph for the vector-value time domain signal can be produced as shown in FIG. 4.

Figure 5:
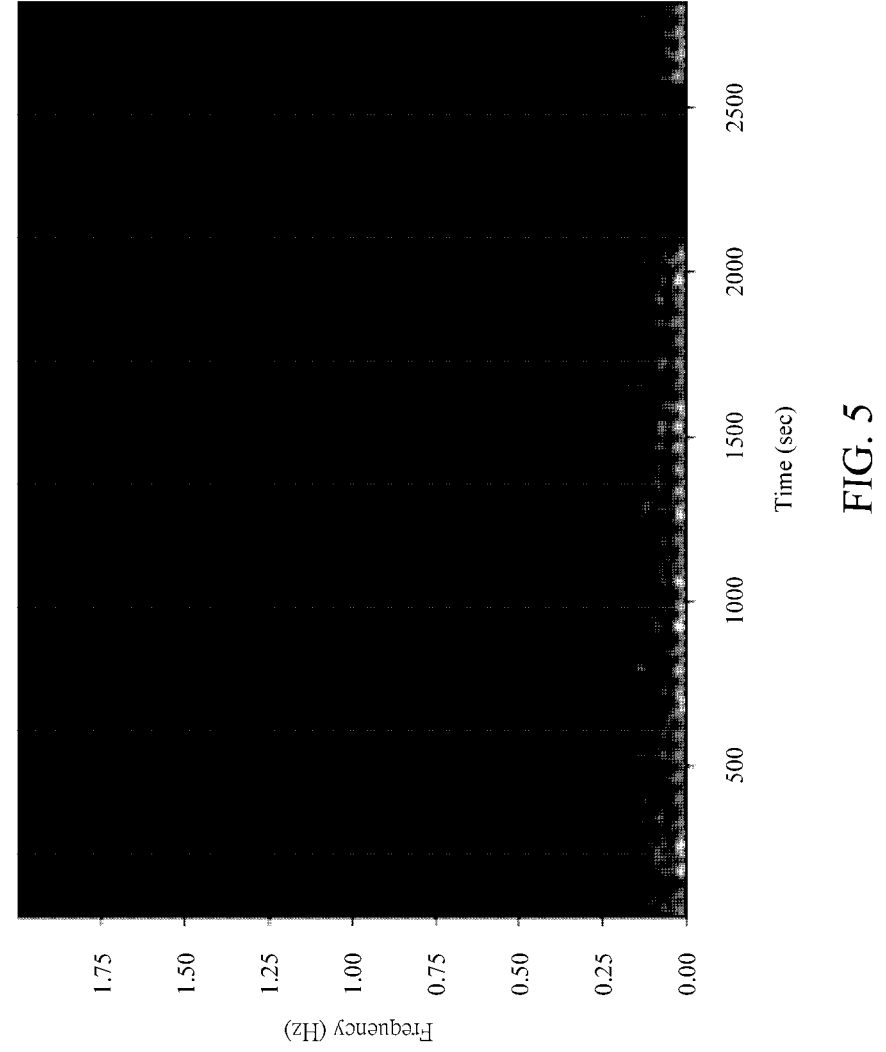
FIG. 5 illustrates schematically a spectrogram generated by the preferred embodiment of the system for detecting occurrence period of cyclical event in accordance with the present invention.

The spectrum conversion and analysis module 24 is to perform a short-time Fourier transform (STFT) upon the vector-value time domain signal with respect to a window width so as for generating a spectrogram (as shown in FIG. 5), and the spectrogram includes a plurality of composition frequencies and correspondingly a plurality of composition-frequency signals and a plurality of composition-frequency amplitudes. The short-time Fourier transform (STFT) is performed by firstly cutting the vector-value time domain signal into localized signals by a time interval with a fixed window width, and then by performing Fourier transform upon these localized signals. Practically, the window width shall be an integral time of the image capturing period (⅟₃₀ second), preferably one time; i.e., having the window width exactly equal to the image capturing period.

The spectrum conversion and analysis module 24 can define the maximum composition-frequency amplitudes as a maximum amplitude corresponding to the individual window width, and one of the composition frequencies corresponding to this maximum amplitude is defined as a main frequency. In this embodiment, the first window width is extended within 0~⅟₃₀ seconds, the second window width is extended within ⅟₃₀~⅖₃₀ seconds. In this embodiment, the main frequency is about ⅟₇₀ Hz (equal to about 0.014 Hz).

Figure 6:
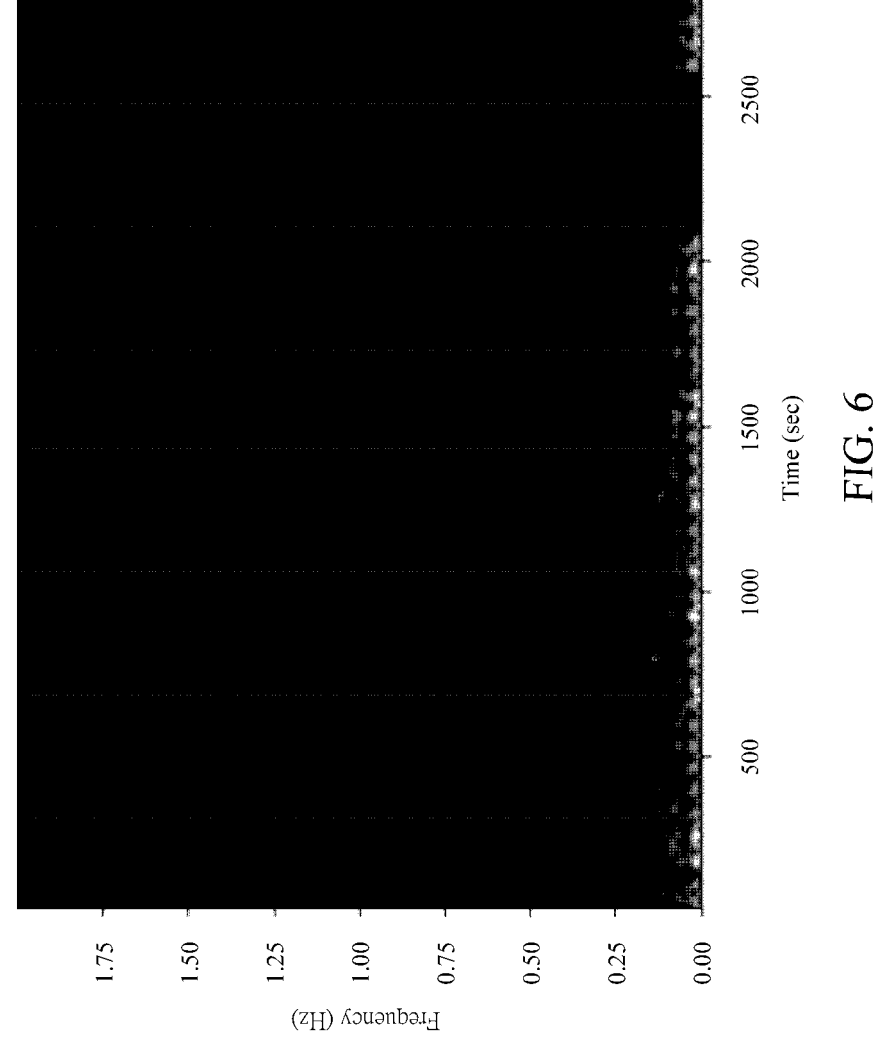
FIG. 6 illustrates schematically a spectrogram generated from FIG. 5 by filtering out noise signals thereof.

The noise filtration module 25 includes a noise filtering unit 251 and a representative frequency-signal generating unit 252. The noise filtering unit 251 can define a critical noise amplitude according to the maximum amplitude, and at least one of the composition-frequency signals whose composition-frequency amplitude is less than a critical noise amplitude would be deemed as noise signals (in terms of frequency composition) and thus removed. Preferably, the critical noise amplitude can be 10% of the maximum amplitude. After the noise filtering unit 251 removes the noise signals in frequency composition, the spectrogram shown in FIG. 5 would be converted into the spectrogram shown in FIG. 6.

Figure 7:
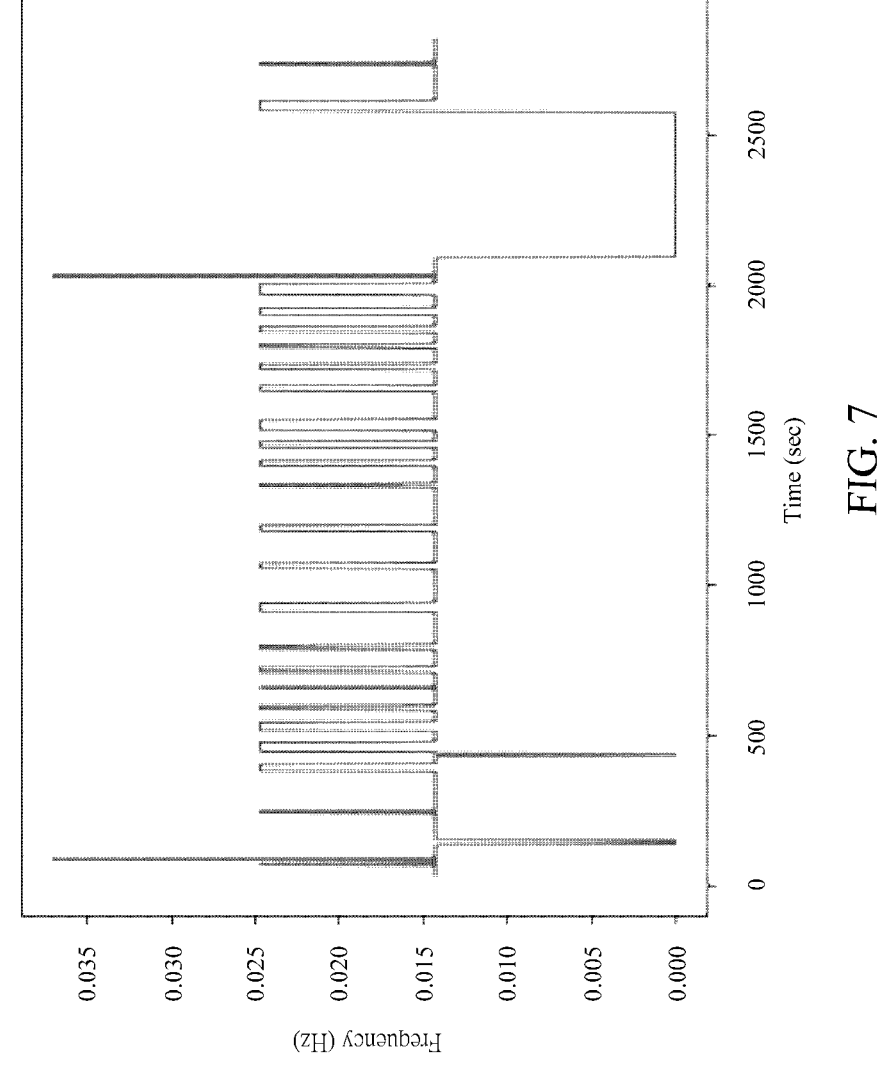
FIG. 7 illustrates schematically a waveform of a representative frequency time domain signal generated by the preferred embodiment of the system for detecting occurrence period of cyclical event in accordance with the present invention.

The representative frequency-signal generating unit 252 can capture the rest of the composition-frequency signals in the form of composition frequencies, and sequentially, in each the window width, the composition frequency of the valid composition-frequency signals who has the maximum amplitude would be captured and defined as a representative frequency for the instant window width. As such, the representative frequency time domain signal can be generated. In other words, while in the first window width (0~⅟₃₀ seconds), the frequency with the maximum amplitude is captured to be the representative frequency of the first window width (0~⅟₃₀ seconds); while in the second window width (⅟₃₀~⅖₃₀ seconds), the frequency with the maximum amplitude is captured to be the representative frequency of the second window width (⅟₃₀~⅖₃₀ seconds); and so on. Thus, the waveform graph for the representative frequency time domain signal can be obtained as shown in FIG. 7. Since a representative frequency is used to stand for the instant window width, thus the waveform graph of the representative frequency time domain signal would be illustrated to have square waves with different amplitudes. In this embodiment, the main frequency is about ⅟₇₀ Hz (i.e., 0.014 Hz). From FIG. 7, it can be seen that most of the representative frequencies with respect to the corresponding window widths are about ⅟₇₀ Hz (i.e., 0.014 Hz).

The event-occurrence period judgment module 26 can include an achievement-rate calculating unit 261, a statistical unit 262, an event-occurrence time calculating unit 263 and an event-occurrence period calculating unit 264.

The achievement-rate calculating unit 261 is to multiply each of the plurality of window widths and the corresponding representative frequency so as to obtain a time-interval frequency product term, and the time-interval frequency product terms are orderly added to obtain an event-cycle achievement rate. Practically, the event-cycle achievement rate (ECAR) can be obtained by executing the following equation:

$$ECAR = \sum_{i=1}^{n} f_i \cdot T_w$$

in which, $i$ stands for the $i-th$ window width;

$f_i$ stands for the representative frequency corresponding to the $i-th$ window width, in Hz;

$T_w$ stands for the window width, $1/30$ seconds in this embodiment;

and, $n$ stands for the product$-$term accumulation number of the time$-$interval frequency product term.

The meaning that the event-cycle achievement rate ECAR is equal to 1 implies the completion of one cyclical event, the meaning that the event-cycle achievement rate ECAR is equal to 2 implies the completion of two cyclical events, and so on.

The statistical unit 262 is to calculate a product-term accumulation number upon every time when the event achievement rate reaches an integer. Thus, upon when the event achievement rate reaches a plurality of the aforesaid integers, a plurality of the aforesaid product-term accumu-
lation numbers would be computed respectively. In this
embodiment, when the product-term accumulation number n
is approximately equal to 2100, 4201, 6300 . . . , the
event-cycle achievement rate ECAR would just reach 1, 2,
3 . . . . Here, the term "just" implies "exactly equal to" or "if
there is no one that is exactly equal to, then the one that is
greater than but the closest to".

For example: if n=2100, and the event-cycle achievement
rate ECAR=1, then, when the event-cycle achievement rate
ECAR is just 1, the product-term accumulation number n
would be 2100. For another example: if n=2099, and the
event-cycle achievement rate ECAR=0.9998, then, when the
product-term accumulation number n is 2100, the event-
cycle achievement rate ECAR=1.0001. For one more
example; if the product-term accumulation number n is
2101, and the event-cycle achievement rate ECAR=1.0003,
then, when the event-cycle achievement rate ECAR just
reach 1, n=2100.

The event-occurrence time calculating unit 263 is to
multiply the product-term accumulation number and the
individual window widths, such that a plurality of event
occurrence times can be obtained. In this embodiment, when
the event-cycle achievement rate ECAR=1, a product of the
product-term accumulation number n (2100) and the win-
dow width (1/30) would produce the event occurrence time of
the first cyclical event to be 70 seconds; when the event-
cycle achievement rate ECAR=2, a product of the product-
term accumulation number n (4201) and the window width
(1/30) would render the event occurrence time of the second
cyclical event to be 140.03 seconds. When the event-cycle
achievement rate is ECAR=3, then a product of the product-
term accumulation number n (6300) and the window width
(1/30) would produce the event occurrence time of the third
cyclical event to be 210 seconds; and so on.

Figure 8:
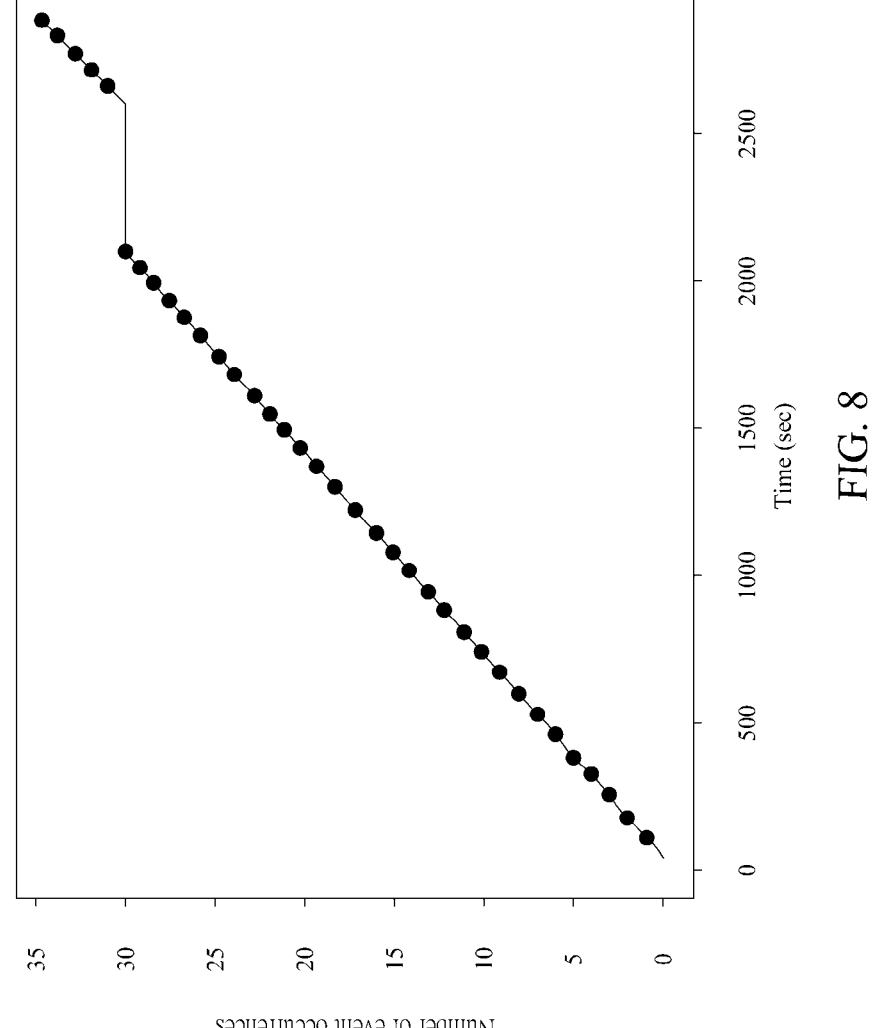
FIG. 8 shows schematically relationships between the number of event occurrences and the event occurrence time in accordance with the present invention.

Since the event-cycle achievement rate ECAR refers to
the number of event occurrences of the cyclical event, so it
can be replaced simply by the number of event occurrences.
As such, FIG. 8 is produced to illustrate schematically the
relationship between the number of event occurrences and
the event occurrence time. As shown, each dot mark stands
for the point that the number of event occurrences is an
integer. From left to right in the figure, the first dot mark
stands for the event occurrence time of the first cyclical
event, the second dot mark stands for the event occurrence
time of the second cyclical event, and so on.

The event-occurrence period calculating unit 264 can
evaluate a time difference between two neighboring event
occurrence times to calculate an event-occurrence time
difference. Preferably, an average of a plurality of the
event-occurrence time differences can serve as an event
occurrence period.

In this embodiment, the event occurrence time of the first
cyclical event is 70 seconds, the event occurrence time of the
second cyclical event is 140.03 seconds, and the event
occurrence time of the third cyclical event is 210 seconds.
Thus, the event-occurrence time difference between the
second cyclical event and the first cyclical event is 70.0
seconds, the event-occurrence time difference between the
third cyclical event and the second cyclical event is 69.97
seconds, and the average of these two event-occurrence time
differences (i.e., the event occurrence period) would 70
seconds. Definitely, more precise event occurrence period
can be obtained by averaging more event-occurrence time
differences.

Practically, the event-occurrence period judgment module
26 can utilize the aforesaid technique to determine a more precise event occurrence period, and also can directly study
the waveform graph of the representative frequency time
domain signal to determine the most frequent representative
frequency among all the window widths to be the main
frequency. In this embodiment, the most frequent represen-
tative frequency is about 0.014 Hz (i.e., 1/70 Hz). It implies
that the main frequency is about 1/70 Hz, and this main
frequency can be inversed to approximately estimate that the
event occurrence period is 70 seconds.

Also, in FIG. 8, the 30-th dot mark is located around the
2100 seconds. It implies that about 2100 seconds are
required to complete 30 rounds of the cyclical event, and
thus the 70-second event occurrence period can be verified.
In addition, from FIG. 7 and FIG. 8, between 2100 seconds
and 2600 seconds, all the representative frequencies for
individual window widths are zero, and no dot mark is
shown. It implies that no cyclical event occurs in the
duration between 2100 seconds and 2600 seconds.

Since the aforesaid feature-vector capturing module 22,
signal generation module 23, spectrum conversion and
analysis module 24, noise filtration module 25 and event-
occurrence period judgment module 26 are all created by
executing the judgment program JAP, thus the modules 21,
22, 23, 24 can be basically main programs, sub-programs or
program pages or functional interfaces created after execut-
ing the judgment program JAP. Anyone with general knowl-
edge in the technical field (especially the field of artificial
intelligence algorithms) can use the above learning and
judgment logic and appropriate programming languages to
write the judgment program JAP (including main and sub
programs) able to create the aforesaid feature-vector cap-
turing module 22, signal generation module 23, spectrum
conversion and analysis module 24, noise filtration module
25 and event-occurrence period judgment module 26, such
that various purposes of this disclosure can be fulfilled.

In summary, in the system for detecting occurrence period
of cyclical event 100 provided by this invention, the event
occurrence period of the cyclical event is directly analyzed
from the monitoring images in the dynamic surveillance
image data, and thus the system can be directly applied to
detect the event occurrence periods (such as the work-event
occurrence period of the work station 200) of different
cyclical events (such as the periodic work event of the work
station 200). Thereupon, the effect of event-occurrence
period detection of multiple different cyclical events can be
obtained without spending more resources and money.

Especially when the system of this invention is applied to
a work station, it is no more need to spend further resources
to easily detect the work event occurrence period of multiple
different work stations. Thus, costs for detecting multiple
work event cycles of work events in the production line can
be significantly reduced.

While the present invention has been particularly shown
and described with reference to a preferred embodiment, it
will be understood by those skilled in the art that various
changes in form and detail may be without departing from
the spirit and scope of the present invention.

What is claimed is:

1. A system for detecting occurrence period of cyclical
event, applied to detect an event occurrence period of a
cyclical event, comprising:
   an image monitoring device, configured for capturing
      periodically a plurality of monitoring images at a
      plurality of image capturing times from a monitoring
      field according to an image capturing period, so as to form in series a dynamic surveillance image data, the cyclical event being occurred in the monitoring field; and a period judgment device, communicatively connected with the image monitoring device, furnished with a judgment program, the judgment program being executed to create:

a feature-vector capturing module, configured for capturing the dynamic surveillance image data from the image monitoring device, and further for capturing a plurality of feature vectors of the plurality of monitoring images corresponding to the plurality of image capturing times from the dynamic surveillance image data by utilizing a mathematical operation model generated through deep learning;

a signal generation module, configured for calculating the plurality of feature vectors to obtain a plurality of vector values according to an occurrence order of the plurality of image capturing times, and further for generating a vector-value time domain signal according to the plurality of image capturing times and the plurality of vector values;

a spectrum conversion and analysis module, configured for generating a spectrogram by applying a short-time Fourier transform upon the vector-value time domain signal through a plurality of window widths, the spectrogram including a plurality of composition frequencies and correspondingly a plurality of composition-frequency signals and a plurality of composition-frequency amplitudes;

a noise filtration module, configured for filtering at least one noise signal corresponding to part of the plurality of composition frequencies, capturing the rest of the plurality of composition-frequency signals corresponding to the rest of the plurality of composition frequencies (defined as a plurality of valid composition-frequency signals), capturing one of the plurality of valid composition-frequency signals having the maximum amplitude from each of the plurality of window widths, defining a composition frequency of the one of the plurality of valid composition-frequency signals having the maximum amplitude as a representative frequency for the instant window width, and generating accordingly a representative frequency time domain signal; and an event-occurrence period judgment module, configured for calculating a plurality of event occurrence times for further determining the event occurrence period according to the representative frequency time domain signals and the plurality of window widths.

2. The system for detecting occurrence period of cyclical event of claim 1, wherein the spectrum conversion and analysis module is configured for defining the maximum of the plurality of composition-frequency amplitudes as a maximum amplitude, and defining one of the plurality of composition frequencies corresponding to the maximum amplitude as a main frequency; the noise filtration module defines a critical noise amplitude according to the maximum amplitude, and filters part of the plurality of composition-frequency signals (noise signal) corresponding to the at least one composition frequency having an amplitude less than the critical noise amplitude from part of the plurality of composition-frequency amplitudes.

3. The system for detecting occurrence period of cyclical event of claim 2, wherein the critical noise amplitude is 10% of the maximum amplitude, and the noise filtration module is to filter part of the plurality of composition-frequency signals (noise signal) corresponding to the at least one composition frequency having an amplitude less than the critical noise amplitude from part of the plurality of composition-frequency amplitudes.

4. The system for detecting occurrence period of cyclical event of claim 1, wherein the window width is equal to the image capturing period, and the spectrum conversion and analysis module is to perform the short-time Fourier transform with the image capturing period.

5. The system for detecting occurrence period of cyclical event of claim 1, wherein the period judgment device further includes a human-machine interface module for a user to set a concern area in the monitoring field, and the cyclical event occurs periodically in the concern area.

6. The system for detecting occurrence period of cyclical event of claim 5, wherein the human-machine interface module includes:

a monitor, configured for displaying the dynamic surveillance image data of the monitoring field; and an operation interface, configured for the user to set the concern area.

7. The system for detecting occurrence period of cyclical event of claim 1, wherein the feature-vector capturing module further includes a concern-area feature-vector capturing unit, the concern-area feature-vector capturing unit is configured for utilizing the mathematical operation model to capture the plurality of feature vectors of the plurality of monitoring images corresponding to the plurality of image capturing times from part of the dynamic surveillance image data corresponding to the concern area.

8. The system for detecting occurrence period of cyclical event of claim 1, wherein the event-occurrence period judgment module further includes:

an achievement-rate calculating unit, configured for calculating a time-interval frequency product term by multiplying each of the plurality of analysis intervals and the corresponding representative frequency, the time-interval frequency product term being sequentially accumulated to obtain an event-cycle achievement rate;

a statistical unit, configured for calculating product-term accumulation number upon every time when the event achievement rate just reaches an integer, and then calculating a plurality of the product-term accumulation numbers correspondingly upon when the event achievement rate just reaches a plurality of the integers;

an event-occurrence time calculating unit, configured for multiplying each of the plurality of product-term accumulation numbers and the corresponding window width, so as to calculate a plurality of event occurrence times; and an event-occurrence period calculating unit, configured for calculating the event occurrence period according to according to at least one event-occurrence time difference of any two neighboring event occurrence times.

* * * * *